United States Patent
Luz Xavier Da Costa et al.

(10) Patent No.: US 12,131,228 B2
(45) Date of Patent: Oct. 29, 2024

(54) METHOD FOR ACCESSING DATA RECORDS OF A MASTER DATA MANAGEMENT SYSTEM

(71) Applicant: International Business Machines Corporation, Armonk, NY (US)

(72) Inventors: Alexandre Luz Xavier Da Costa, Stuttgart (DE); Geetha Sravanthi Pulipaty, Bangalore (IN); Mohammad Khatibi, Richmond Hill (CA); Neeraj Ramkrishna Singh, Bangalore (IN); Abhishek Seth, Deoband (IN)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 16/801,241

(22) Filed: Feb. 26, 2020

(65) Prior Publication Data
US 2020/0320153 A1   Oct. 8, 2020

(30) Foreign Application Priority Data
Apr. 2, 2019 (EP) .................................... 19166696

(51) Int. Cl.
*G06F 16/9535* (2019.01)
*G06F 16/9538* (2019.01)
(Continued)

(52) U.S. Cl.
CPC ......... *G06N 20/00* (2019.01); *G06F 16/9535* (2019.01); *G06F 16/9538* (2019.01); *G06F 18/214* (2023.01)

(58) Field of Classification Search
None
See application file for complete search history.

(56) References Cited

U.S. PATENT DOCUMENTS

| 6,671,669 | B1 | 12/2003 | Garudadri |
| 6,728,704 | B2 | 4/2004 | Mao |

(Continued)

FOREIGN PATENT DOCUMENTS

| CN | 101930447 A | 12/2010 |
| CN | 102043833 A | 5/2011 |

(Continued)

OTHER PUBLICATIONS

International Search Report and Written Opinion, International Application No. PCT/IB2020/052498, International Filing Date Mar. 19, 2020.

(Continued)

*Primary Examiner* — Amresh Singh
(74) *Attorney, Agent, or Firm* — Monchai Chuaychoo

(57) ABSTRACT

An approach for accessing multi-attribute data records of a master data management system. The method comprises: enhancing the master data management system with one or more search engines for enabling data record access. A request of data may be received at the master data management system. A set of one or more of the multiple attributes, referenced in the received request, may be identified. A combination of one or more of the search engines of the master data management system, whose performances for searching values of at least part of the set of attributes fulfil a current selection rule may be selected. And, the request may be processed using the combination of search engines. At least part of the results of the processing may be provided, and the selection rule may be updated based on user operations on the provided results, the updated selection rule becoming the current selection rule.

18 Claims, 9 Drawing Sheets

(51) Int. Cl.
*G06F 18/214* (2023.01)
*G06N 20/00* (2019.01)

(56) References Cited

U.S. PATENT DOCUMENTS

| | | | |
|---|---|---|---|
| 7,716,203 | B2 | 5/2010 | Chouinard |
| 7,831,438 | B2 | 11/2010 | Riley |
| 7,856,446 | B2 | 12/2010 | Brave |
| 8,620,910 | B2 | 12/2013 | Shiraishi |
| 9,230,041 | B2 * | 1/2016 | Lightner ........... G06F 16/24578 |
| 11,269,665 | B1 * | 3/2022 | Podgorny ............ G06N 20/00 |
| 2011/0191312 | A1 * | 8/2011 | Gutlapalli ............ G06F 16/00 707/706 |
| 2011/0213771 | A1 | 9/2011 | Kanno |
| 2015/0095303 | A1 | 4/2015 | Sonmez |
| 2015/0339356 | A1 * | 11/2015 | Myslinski ............ A63F 13/795 707/728 |
| 2016/0063052 | A1 | 3/2016 | Natarajan |
| 2016/0112394 | A1 | 4/2016 | Sahu |
| 2017/0103110 | A1 * | 4/2017 | Winstanley ........... G06F 16/334 |

FOREIGN PATENT DOCUMENTS

| | | |
|---|---|---|
| CN | 103164454 A | 6/2013 |
| CN | 106383984 A | 2/2017 |
| CN | 109478195 A | 3/2019 |
| CN | 113661488 A | 11/2021 |
| GB | 2596741 A | 1/2022 |
| JP | 2002007418 A | 1/2002 |
| JP | 2008527502 A | 7/2008 |
| JP | 2010267075 A | 11/2010 |
| JP | 2009107628 A1 | 6/2011 |
| JP | 2010058519 A1 | 4/2012 |
| JP | 2019501466 A | 1/2019 |
| WO | 2006074052 A1 | 7/2006 |
| WO | 2017123799 A1 | 7/2017 |
| WO | 2020201875 A1 | 10/2020 |

OTHER PUBLICATIONS

Examination Report, Patents Act 1977: Examination Report under Section 18(3), Application No. GB2114691.5, Dated Sep. 14, 2022, 8 pages.
Shteynberg et al., "Combining Results of Multiple Search Engines in Proteomics", Molecular & Cellular Proteomics 12.9, Sep. 2013, pp. 2383-2393.
Notice of Reason for Refusal, Japanese Patent Application No. 2021-557224, dated Apr. 25, 2024, 3 pages.

* cited by examiner

401

| Record | Score by the engine |
|---|---|
| R4 | 18 |
| R5 | 16 |
| R6 | 14 |

402

| Record | Score by the engine |
|---|---|
| R1 | 10 |
| R2 | 9 |
| R3 | 8 |

403

| Record | Normalized score |
|---|---|
| R1 | 10 |
| R2 | 9 |
| R3 | 8 |
| R4 | 9 |
| R5 | 8 |
| R6 | 7 |

FIG. 4A

| Search engine | Engine Weight (Wa) |
|---|---|
| Engine 1 | 0.5 |
| Engine 2 | 0.5 |

FIG. 4B

| Attribute / Confidence -> | Weight based on Confidence of Entity Recognizer (Wb) | | | | | | | | | |
|---|---|---|---|---|---|---|---|---|---|---|
| | 0-10% | 10-20% | 20-30% | 30-40% | 40-50% | 50-60% | 60-70% | 70-80% | 80-90% | 90-100% |
| Name | 0.1 | 0.2 | 0.3 | 0.4 | 0.5 | 0.6 | 0.7 | 0.8 | 0.9 | 1 |
| DOB | 0.1 | 0.2 | 0.3 | 0.4 | 0.5 | 0.6 | 0.7 | 0.8 | 0.9 | 1 |
| Address | 0.1 | 0.2 | 0.3 | 0.4 | 0.5 | 0.6 | 0.7 | 0.8 | 0.9 | 1 |
| Identifier | 0.1 | 0.2 | 0.3 | 0.4 | 0.5 | 0.6 | 0.7 | 0.8 | 0.9 | 1 |
| Email | 0.1 | 0.2 | 0.3 | 0.4 | 0.5 | 0.6 | 0.7 | 0.8 | 0.9 | 1 |

FIG. 4C

| Completeness | 0-10% | 10-20% | 20-30% | 30-40% | 40-50% | 50-60% | 60-70% | 70-80% | 80-90% | 90-100% |
|---|---|---|---|---|---|---|---|---|---|---|
| Wc | 0.1 | 0.2 | 0.3 | 0.4 | 0.5 | 0.6 | 0.7 | 0.8 | 0.9 | 1 |

| Freshness | < 1yr | 1-2 years | 2-3 years | 3-5 years | 5-10 years | > 10 years |
|---|---|---|---|---|---|---|
| Wd | 1 | 1 | 0.9 | 0.8 | 0.7 | 0.5 |

| Record | Initial score | Wa | Wb | Wc | Wd | Final score |
|---|---|---|---|---|---|---|
| R1 | 10 | 0.5 | 0.9 | 0.8 | 1 | 3.6 |
| R2 | 9 | 0.5 | 0.9 | 0.9 | 1 | 3.6 |
| R3 | 8 | 0.5 | 0.9 | 0.3 | 0.6 | 0.6 |
| R4 | 9 | 0.5 | 0.6 | 0.5 | 0.5 | 0.7 |
| R5 | 8 | 0.5 | 0.6 | 0.5 | 0.6 | 0.7 |
| R6 | 7 | 0.5 | 0.6 | 0.8 | 1 | 1.7 |

Monitoring user operations on search results
501

Analyzing the monitored user operations
503

| Completeness | User Clicks |
|---|---|
| 0.26 | 0 |
| 0.09 | 0 |
| 0.56 | 1 |
| 0.80 | 0 |
| 0.54 | 0 |
| 0.63 | 0 |
| 0.12 | 0 |
| 0.19 | 0 |
| 0.17 | 0 |
| 0.62 | 1 |
| 0.58 | 1 |
| 0.44 | 1 |
| 0.35 | 0 |
| 0.06 | 0 |
| 0.07 | 0 |
| 0.74 | 1 |
| 0.95 | 1 |
| 0.47 | 0 |
| 0.13 | 0 |
| 0.69 | 0 |
| 0.22 | 0 |
| 0.23 | 0 |
| 0.46 | 0 |
| 0.55 | 0 |
| 0.77 | 1 |
| 0.80 | 1 |
| 0.97 | 1 |
| 0.19 | 0 |
| 0.54 | 0 |

FIG. 6A

| Completeness | % of Clicks |
|---|---|
| 0 to 10% | 0% |
| 10 to 20% | 0% |
| 20 to 30% | 0% |
| 30 to 40% | 4% |
| 40 to 50 % | 11% |
| 50 to 60 % | 12% |
| 60 to 70 % | 16% |
| 70 to 80 % | 18% |
| 80 to 90 % | 20% |
| 90 to 100 % | 20% |

METHOD FOR ACCESSING DATA RECORDS OF A MASTER DATA MANAGEMENT SYSTEM

BACKGROUND

The present invention relates to the field of digital computer systems, and more specifically, a method for accessing data records of a master data management system.

Enterprise data matching deals with matching and linking customer data received from different sources and creating a single version of the truth. Master data management (MDM) based solutions work with enterprise data and perform indexing, matching and linking of data. The master data management system may enable access to these data. However, there is a continuous need to improve access to data in master data management systems.

SUMMARY

Various embodiments provide for a method for accessing data records of a master data management system, a computer system and a computer program product as described by the subject matter of the independent claims. Advantageous embodiments are described in the dependent claims. Embodiments of the present invention can be freely combined with each other if they are not mutually exclusive.

According to an embodiment of the present invention, a method for accessing data records of a master data management system, the data records comprising multiple attributes, the method comprising: enhancing the master data management system with one or more search engines for enabling access to the data records; receiving at the master data management system a request of data; identifying a set of one or more attributes, of the multiple attributes, which are referenced in the received request; selecting a combination of one or more search engines, of the search engines of the master data management system, whose performances for searching values of at least part of the set of attributes fulfill a current selection rule; processing the request using the combination of search engines; and providing at least part of the results of the processing.

According to an embodiment of the present invention, a computer program product comprising: a computer-readable storage medium having computer-readable program code embodied therewith, the computer-readable program code configured to for accessing data records of a master data management system, the data management system comprising search engines for enabling access to the data records, the data records comprising multiple attributes, the computer-readable program code further configured to: receive at the master data management system a request of data; identify a set of one or more attributes, of the multiple attributes, which are referenced in the received request; select a combination of one or more search engines, of the search engines of the master data management system, whose performances for searching values of at least part of the set of attributes fulfill a current selection rule; process the request using the combination of search engines; and provide at least part of the results of the processing.

According to an embodiment of the present invention, a computer system for enabling access to data records of a master data management system, the data records comprising multiple attributes, the computer system comprising: a user interface configured for receiving a request of data; a plurality of search engines for enabling access to the data records, wherein the search engines are configured for processing the request; an entity identifier configured for identifying a set of one or more attributes, of the multiple attributes, which are referenced in the received request; an engine selector configured for selecting a combination of one or more search engines, of the search engines, whose performances for searching values of at least part of the set of attributes fulfil a current selection rule; and a result provider configured for providing at least part of the results of the processing.

BRIEF DESCRIPTION OF THE DRAWINGS

In the following, embodiments of the invention are explained in greater detail, by way of example only, making reference to the drawings in which:

FIG. 4A depicts tables comprising search results from different engines being normalized and merged, FIG. 4B depicts a table comprising examples of engine weights, FIG. 4C depicts a table comprising examples of attribute weights based on confidence with which entity recognizer identified the attribute type, FIG. 6A depicts a table comprising number of user clicks as function of the completeness of data records.

DETAILED DESCRIPTION

Figure 1:
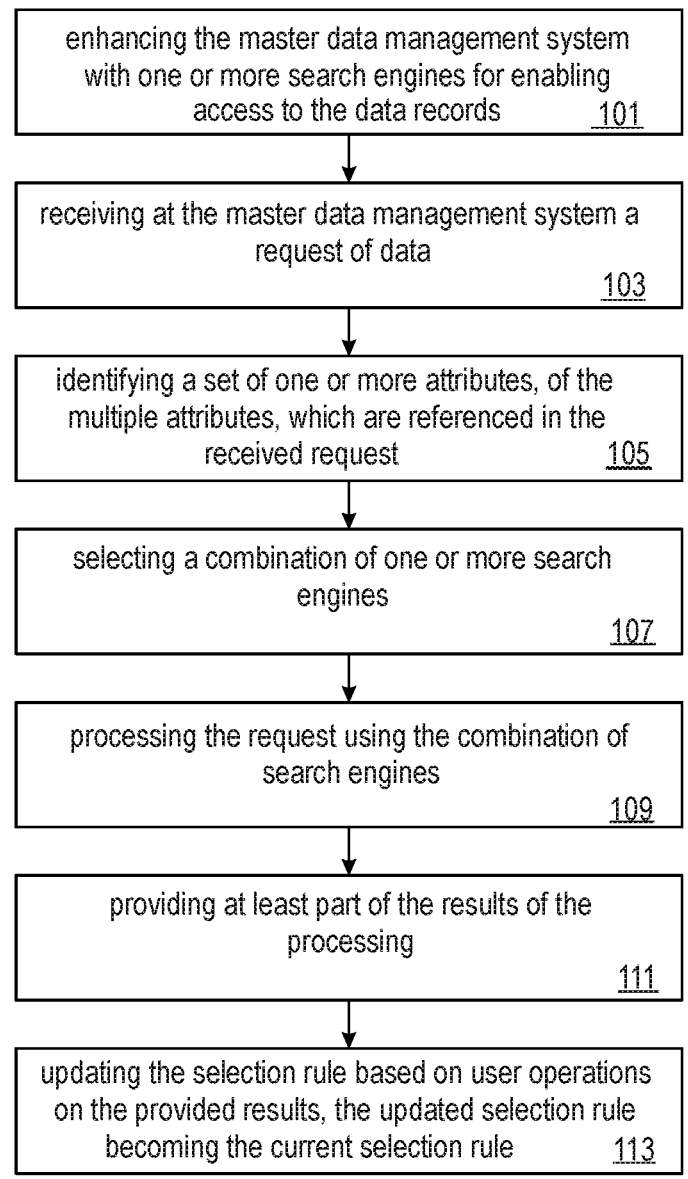
FIG. 1 is a flowchart of a method for accessing data records of a master data management system.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may enable an efficient access to data stored in a master data management system. The present subject matter may improve the performance of the master data management system. The present subject matter may mitigate the number of repeated or retried search requests because it may provide the best possible results using multiple search engines and thus a user does not have to retry or reformulate search queries as it may be the case with other systems.

The master data management system may use a single type of search engines. With the present subject matter, the master data management system may use different types of search engines. The type of a search engine may be defined by the technique it uses to perform searches such as a full text search or structured probabilistic search. For example, the additional search engines that are added by the present method may be of a type different from the type of the search engine that the master data management system initially comprised. Thus, the present subject matter may provide an ensemble searching and matching engine whose aim is to exploit the best of all the different capabilities of multiple search and indexing engines based on the type of the input data or the type of query made. Different indexing or searching engines do have different capabilities and hence, they work at best for different types of inputs or different requirements. The present subject matter may enable a better way of searching the data by employing multiple different indexing and searching engines enhancing user experience without impacting the performance of machine-based interactions.

For example, the identification, selecting, processing and providing steps may automatically be performed upon receiving the request of data. In one example, the identification, selecting, processing and providing steps may automatically be repeated upon receiving a further request of data, wherein in each repetition the updated selection rule that results from an immediately preceding execution of the method is used.

The results may comprise data records. The provision of the data records may comprise displaying on a graphical user interface data indicative of the data records. For example, for each data record a row may be displayed, wherein the row may be a hyperlink or a link that enables the user to click on in order to access detailed information of the data record.

A data record or record is a collection of related data items such as a name, date of birth (DOB) and class of a particular user. A record represents an entity, wherein an entity refers to a user, object, or concept about which information is stored in the record.

According to one embodiment, the method further comprises updating the selection rule based on user operations on the provided results, the updated selection rule becoming the current selection rule and upon receiving another request of data, repeating the identifying, selecting, processing and providing steps using the current selection rule. In one example, the updating of the selection rule may be performed after a predefined time period e.g. during that period the method may have been executed multiple times and the updating is performed based on the combination of user operations on provided results during the time period. This may enable a self-improving search system based on user inputs and experiences. A search engine whose performances for searching values of at least part of the set of attributes fulfill a current selection rule is a search engine that is part of a predefined table of the data management system in association with that at least part of the set of attributes. For example, the table comprises multiple entries. Each entry i of the table comprises a search engine $SE_i$ and associated one or more attributes $T_i$ that are suitably searched by that search engine. In one example, each association of $T_i$ and $SE_i$ may be assigned an update score that can be changed or updated. The selected search engines are search engines $SE_i$ of the table that are associated with one or more attributes of the set of attributes e.g. if the set of attributes comprises T1 and T2, the table may be searched to identify entries having T1 and T2 and the selected search engines are the search engines of those identified entries. The updating of the selection rule may comprise updating the table, e.g., if the number of clicks on displayed results coming from a search engine $SE_j$ and associated to a searched given attribute $T_j$ is smaller than a threshold, the table may be updated accordingly, e.g., delete the association between $T_j$ and $SE_j$ or if $T_j$ and $SE_j$ are associated with the update score changing that update score by, e.g., lowering it. The deletion may for example be performed if the same combination $T_j$ and $SE_j$ has been previously found at least once as not well performing, e.g., the number of clicks of associated results was smaller than the threshold multiple times and thus the associated update score goes below a given threshold. In one example, the table initially had many or all possibilities of combinations between attributes and search engines and over a predefined period, non-performing entries may be removed.

According to one embodiment, the results comprise data records of the master data management system in association with respective matching scores as obtained by scoring engines of the search engines, wherein the provided results comprise non-duplicated data records having a matching score higher than a predefined score threshold. A matching score may indicate the level or degree of matching between a data record and requested data.

By providing only results which fulfill a matching score's selection criterion, this embodiment may further improve the performance of the master data management system. For example, irrelevant results may not be provided to the user. This may save processing resources, e.g., display resources and data transmission resources that would be used for the irrelevant results. The weighting of the scores may for example be performed as described in the following embodiment.

According to one embodiment, the results comprise data records of the master data management system in association with respective matching scores as obtained by scoring engines of the search engines, the method further comprising weighting the matching scores in accordance with performances of components involved in producing the results, the components comprising at least part of method steps and elements used for producing the results and the results, wherein the provided results comprise non duplicated data records having a weighted matching score higher than a predefined score threshold. The weighting may for example comprise: for each data record of the results, assigning a weight to each component of the components that provided or produced the data record, wherein the components may comprise the provided data record itself, combining the weights and weighting the matching score of the data record using the combined weight.

For example, the production of search results of a received data request involves execution of a search process (the present method may comprise the search process). This search process has multiple process steps, wherein each process step may be performed by a system element such a search engine or scoring engine etc. The search process may have components which are the process steps and/or the system elements and/or the results it provides. Each component may have a function it performs for contributing to the obtaining of the search results. Those components of the search process may each have an impact on the quality of the results obtained. For example, if a component of the search process is not functioning properly this may affect the search results. For example, if the component is the process step of identifying attributes in the received request, and this component may not be efficient in identifying a certain type of attributes, it may happen that this process step does not correctly identify this type of attributes. Thus, when receiving a request of data that has this type of attributes referenced in it, the results obtained may be affected as they may comprise irrelevant non wanted search results of wrongly identified attributes. The performance of the components of the search process may have different contributions to the results obtained by the search process. This embodiment may take into consideration at least part of those contributions by weighting the matching scores accordingly. For example, each component of at least part of the components of the search process of this embodiment may be assigned a weight indicative of its performance of performing its respective function. The weights may for example be user defined, e.g., the weight may initially be defined by the user (e.g., for a first execution of the present method) and may automatically be updated later on as described herein with the weight updating method. Those weights may be used to weight the matching scores. This embodiment may further increase the performance of the data management system. For example, further irrelevant results may not be provided to the user. This may save processing resources, e.g., display resources and data transmission resources.

Examples of components being considered in the weighting of the search process may be described in the following embodiment. This embodiment may be advantageous as it identifies and weights the components whose performance may have larger impacts on the search results.

According to one embodiment, the components comprise the search engines, the identification step and the results. The method further comprises: assigning to each search engine of the search engines an engine weight; assigning attribute weights to the set of attributes, wherein the attribute weight of an attribute is indicative of the confidence level by which said attribute is identified; assigning to each data record of the results a completeness weight indicative of the completeness of the data record and a freshness weight indicative of the freshness of the data record; for each data record of the results combining the respective engine weight, attribute weight, completeness weight and freshness weight, and weighting the score of the data record by the combined weight. The attribute weight may be generated at attribute level and applied to full result set (and all the attributes), which were returned for the received request. This may enable if an auto-determined search-entity-type itself is not correct, then the result set would also be likely less useful.

The following embodiments provide a weight updating method for updating the weights used in accordance with the present subject matter. They enable an efficient and systematic processing of the weighting procedure.

According to one embodiment, the method further comprises: providing a user parameter quantifying user operations on the provided results; for each component of at least part of the components, determining the values of the user parameter and associated values of a component parameter descriptive of the component; and using the determined association for updating the weight assigned to the component. The component parameter may for example comprise at least one of completeness, freshness of a data record, ID of a search engine, and confidence by which attributes may be identified.

For example, the user operations or interactions may be monitored by an activity monitor of the master data management system. In one example, the user operation may be a user click on a provided result. The user parameter and associated values of the component parameters may be provided in the form of a distribution that can be fitted or modeled to derive weights. For example, the distribution of counts of clicks versus various characteristics of a row representing a data record (e.g., a characteristic may for example indicate which search engine the data record came from, what was the confidence of entity type detection, how complete was the record, how fresh is the record etc.) may be provided and analyzed to find weights. This embodiment may for example be executed for every new click e.g. every new click when fed back to the system can change the distribution and hence helps re-assignment of weights. This embodiment may enable to update the weights used in the previous iteration of the present method. This embodiment may enable the data management system to keep self-improving based on its own experience with data searches. For example, all the weights used in the above embodiments may be updated. In another example, only part of the weights (e.g. completeness weights) used may be updated. Updating the weights may comprise determining new weights and replacing the used weights by the respective new weights. The new weights may be determined in accordance with this embodiment by monitoring user activities with regard to the results provided to the user.

According to one embodiment, the method further comprises providing a lookup-table associating the user parameter's values with the values of the component parameters and using the look-table for updating the weight assigned to the component.

According to one embodiment, the method further comprises modeling the variation of the user parameter's values as function of the values of the component parameter using a predefined model, and using the model for determining an updated weight of the component and using the updated weight for updating the weight assigned to the component. For example, the predefined model may be configured to receive as input a component parameter value and to output a respective weight. This may enable an accurate weighting technique in accordance with present subject matter.

According to one embodiment, a user operation of the user operations comprises a mouse click on a displayed result of the provided results, wherein the user parameter comprises at least one of the number of clicks, the frequency of clicks and the duration of accessing a given result of the results. For example, an activity monitor may use count of clicks and/or can check the time spent on individual result (e.g., after it was clicked till a back/restart button was used) and/or it can check back-and-forth operations on a result set and the last chosen record where users has spent time above some threshold can be considered as "the result that the user liked".

According to one embodiment, for each attribute of the set of attributes, the selection rule comprises: for each search engine of the search engines, determining a value of a performance parameter indicative of the performances of the search engine for searching values of the attribute; weighting the determined values with respective current weights; selecting the search engines whose performance parameter values are higher than a predefined performance threshold value.

For example, in a first or initial execution of the method of this embodiment, the current weights may be set to 1. In another example, if the set of attributes comprises three attributes att1, att2 and att3, the performance of each search engine e.g. search engine 1 (SE1), may be evaluated. This may result, for each search engine, in three performance parameters values Perf_att1_SE1, Perf_att2_SE1 and Perf_att3_SE1. The current weights of the search engine SE1 can be determined from Perf_att1_SE1, Perf_att2_SE1 and Perf_att3_SE1, resulting in weights W1_SE1, W2_SE1 and W2_SE1. Those weights may be used to weight the performance parameters values Perf_att1_SE1, Perf_att2_SE1 and Perf_att3_SE1. In order to decide whether the search engine SE1 is to be selected or not a combination of the weighted Perf_att1_SE1, Perf_att2 SE1 and Perf_att3 SE1 may be determined and if the combined value (e.g. average) is higher than the performance threshold value, SE1 may be selected. In another example, each of the weighted performance values Perf_att1_SE1, Perf_att2_SE1 and Perf_att3_SE1 is compared with the performance threshold value and only if each of them is higher than the performance threshold value SE1 may be selected.

According to one embodiment, the performance parameter comprises at least one of: the number of results and the level of matching of the results to the expectations or to what is requested.

According to one embodiment, the selection rule using a table associating attributes to corresponding search engines, the updating of the selection rule comprises: determining the values of a user parameter quantifying the user operations on provided results of each engine of the combination of the search engines; and using the determined values associated with each search engine of the combination of the search engines for identifying the values of the user parameter that are smaller than a predefined threshold and for each identified value of the user parameter determining the attribute of the set of attributes and the search engine that is associated with the identified values and updating the table using the determined attribute and search engine. In one example, the table initially had many or all possibilities of combinations between attributes and search engines. For example, after a predefined period, non-performing entries may be removed. For example, the user parameter may be the number of clicks on each result of the provided results i.e. for each displayed result there is a value of the user parameter. Those values may be compared with a predefined threshold (e.g. 10 clicks) and the displayed results that are associated with values smaller than the threshold may be identified. Each of those identified results is obtained by a given search engine X as a result of searching one or more attributes e.g. attribute T1 of the set of attributes. Thus, X and T1 may be used to update the table as described herein.

According to one embodiment, the processing of the request is performed in parallel by the combination of the search engines. This may speed up the search process of the present subject matter.

According to one embodiment, the combination of search engines is a ranked list of search engines, wherein the processing of the request is consecutively performed following the ranked list until a minimum number of results is exceeded. This may save processing resources. If the engine selection rule suggests only engine1 (SE1) but the actual search does not produce enough results, SE2 (the next one in the ranked list) may be used.

According to one embodiment, the provided results comprise data records that are filtered depending on the sender of the request. For example, data governance rules are applied after getting a list of matches for the given data input and providing role-based visibility and applying consent related filters; thus respecting privacy while providing better quality of match and the flexibility in search.

According to one embodiment, identifying the set of attributes comprises inputting the received request to a predefined machine learning model; receiving from the machine learning model a classification of the request, the classification indicating set of attributes.

According to one embodiment, the selection rule comprises: inputting the set of attributes to a predefined machine learning model and receiving from the machine learning model one or more search engines that may be used for searching the set of attributes.

According to one embodiment, the method further comprises: receiving a training set indicative of different sets of one or more attributes, wherein each set of attributes is labeled to indicate search engines that are suitable to perform the search of the set of attributes; training a predefined machine learning algorithm using the training set, thereby generating the machine learning model.

FIG. 1 is a flowchart of a method for accessing data records of a master data management system. The data records comprise multiple attributes.

For example, the master data management system may process records received from client systems and store the data records into a central repository. The client systems may for example communicate with the master data management system via a network connection which comprises, for example, a wireless local area network (WLAN) connection, WAN (Wide Area Network) connection LAN (Local Area Network) connection or a combination thereof.

The data records stored in the central repository may have a predefined data structure such as a data table with multiple columns and rows. The predefined data structure may comprise the multiple attributes (e.g. each attribute representing a column of the data table). In another example, the data records may be stored in a graph database as entities with relationships. The predefined data structure may comprise a graph structure where each record may be assigned to a node of the graph. An example of attributes may be a name, address etc.

The master data management system may comprise a search engine (referred to as initial search engine) that performs searches, using a single technique such as a probabilistic structured search, for data records stored in the central repository based on received search queries. The initial search engine as any other search engines may be well suited for a certain type of attributes but not for others. That is, the performance of the initial search engine may depend on what type of attribute values being searched. For example, attribute "name" may be well searched by a probabilistic search engine because of nicknames and phonetics, while an attribute address like city may work well with a free text search engine because it is partial. For that, in step 101, the master data management system may be enhanced with one or more search engines for enabling access to the data records of the central repository. This may result in multiple search engines comprising the initial search engine and the added search engines. For example, each of the search engines of the master data management system may be associated with a respective API through which search queries may be received. This may enable an ensemble searching and matching engine whose aim is to exploit the best of all the different capabilities of multiple search and indexing engines based on the type of the input data or the type of query made. Different indexing or searching engines do have different capabilities and hence, they work at best for different types of inputs or different requirements.

The master data management system may receive a request of data in step 103. The request may for example be received in the form of a search query. The search query may, for example, be used to retrieve attribute values, collections of attribute values or any combination thereof. The search query may for example be SQL query. The received request may refer to one or more attributes of the data records of the central repository. This may for example be performed by explicitly referring to attributes in the request and/or indirectly referring to the attributes. For example, the search query may be a structured search where comparison or range predicates are used to restrict values of certain attributes. The structured search may provide explicit reference to the attributes. In another example, the search query may be an unstructured search, e.g. a keyword search which filters out records that do not contain some form of the specified keyword. The unstructured search may indirectly reference an attribute. In one example, the received request may comprise names, types of entities and/or numerical and temporal expressions in an unstructured format.

Upon receiving the request, an entity identifier of the master data management system may be used to identify in step 105 a set of one or more attributes which are referenced in the received request. The identification of the set of attributes may further comprise identifying an entity type of each attribute of at least part of the set of attributes. For example, the received request may be analyzed e.g. parsed for searching for attributes whose values are searched. For example, the entity identifier may identify names and types of entities, numerical and temporal expressions in user inputs coming in as unstructured text and maps them to the attributes of the master data management system with certain probabilities, which allows them to be used for performing a structured search.

The entity identifier may for example be a token recognizer that identifies a string, numeric value, pattern name, location etc. For example, the identification of an email may use the following email structure abc@uvw.xyz. The identification of phone numbers may be based on the fact that the phone number is a ten digit number. The identification of a Social Security number (SSN) may be based on the fact that the SSN has the following structure AAA-BB-CCCC.

In one example, the entity identifier may use a machine learning (ML) model that is generated by a ML algorithm. The ML algorithm may be configured to read enterprise data and identify/learn the parts of data and identify the attributes. Using the ML model, the entity identifier may determine with certain probabilities if an input text could be a name or address or phone number or SSN etc. The engine selector may also use a ML model that is generated by a ML algorithm to perform the selection.

Using the identified set of attributes (e.g., and/or associated entity types), an engine selector of the master data management system, may select, in step 107, a combination of one or more search engines of the search engines of the master data management system. For example, the performance of each search engine, of the master data management system, for searching values of each attribute of the attributes may be evaluated. The performance of a search engine may be determined by evaluating a performance parameter. The performance parameter may for example be the average number of results that are obtained by the search engine for searching different values of the attribute and which are clicked or used by the user. The performance parameter may alternatively or in addition comprise an average matching score of the results that are obtained by the search engine for searching different values of the attribute and which are clicked or used by the user.

The selection of the combination of the one or more search engines may be performed using a current selection rule. The selection rule may for example be applied for each given attribute of the set of attributes as follows: for each search engine of the search engines of the master data management system, a value of a performance parameter indicative of the performances of the search engine for searching values of the given attribute may be determined. This may result in multiple values for each search engine of the combination of search engines, e.g., if the set of attributes comprises two attributes, each search engine may have two performance values associated with the two attributes.

For example, if the set of attributes comprise name and date of birth attributes, a structured probabilistic search engine may get better results for this set of inputs, and thus may be selected. In addition, a free text search engine may be selected. And, the execution of the request may be performed as follows using the two engines: when there are no results found by the probabilistic search engine a free text search may be performed as well. In another example, both search engines may be used to execute the request regardless of their respective outcomes. In another example, the set of attributes may comprise a year of birth and a phone number. In this case, since probabilistic search engines can take care of edit distance values and year of births can be well catered by free text engines as partial text of date of births, both engines may be selected. If the received request specifically invokes AND or NOT logic, a full text search engine can be used.

After selecting the combination of search engines, the request may be processed in step 109 using the combination of search engines. For example, the engine selector may decide to use the combination of search engines for processing the data either in parallel or sequentially, based on pre-built heuristics. The combination of search engines is used to get a list of candidates, based on rules of the engine selector.

At least part of the results of the processing of the request by the combination of search engines may be provided in step 111, e.g., by a result provider of the master data management system. For example, rows of data records of the results may be displayed on a graphical user interface to enable a user to access one or more data records of the results. For example, the user may perform user operations on the provided results. The user operation may for example comprise a mouse click or a touch gesture or another operation enabling the user to access the provided results.

The provided results may comprise all results obtained after processing the request by the combination of the search engines or may comprise only a predefined part of those all results. For example, the search results from the combination of the search engines are aggregated and duplicates are removed, resulting in a candidate list of data records. The resulting candidate list of data records may be scored. For example, multiple scoring engines of the master data management system are used. For example, depending on the attributes, scoring functions may or may not be available. Since PME based scorer might not be able to score all kinds of entities (e.g., contract type of data), multiple scoring engines are used. Out of all the results obtained, one set of results might go to one scorer and the other set might go to some other scoring engines. The invocation of these scoring engines may be done in parallel to improve efficiency.

Based on the user operations performed on the provided results, the selection rule may be updated in step 113. The updated selection rule becomes the current selection rule and thus can be used for a further received request of data of the master data management system. For example, steps 105-113 may be repeated upon receiving a subsequent request of the received request of step 103 of data of the master data management system, and during this repetition, the updated selection rule may be used in the selection step 107.

For example, the selection rule is initially based mainly on the capability/applicability of the search engines corresponding to a given set of attributes, but the selection rule keeps improving rule based for example on users' clicks, feedback and the outcome (quality and performance) of the searches done so far. An alternate search engine may also dynamically be chosen, if a previous choice of a search engine delivers no results.

Figure 2:
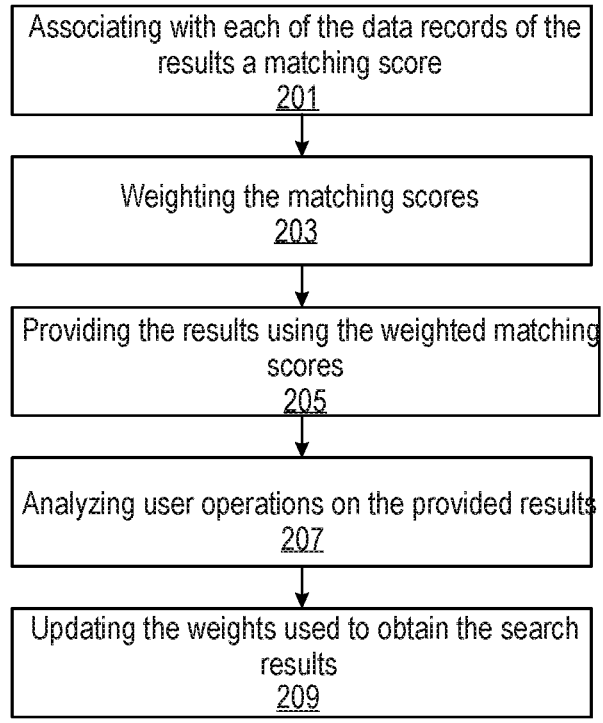
FIG. 2 is a flowchart of a method for providing the search results of a set of search engines.

FIG. 2 is a flowchart of a method for providing the search results of a set of one or more search engines. The method of FIG. 2 may for example be applied to the data management system of FIG. 1 (e.g., FIG. 2 may provide details of step 111 of FIG. 1) or may be applied to other search systems.

For example, the set of search engines may process a search request of data and the search results may for example comprise data records. Each of the data records of the results may be associated with or assigned a matching score in step 201. The matching scores may be obtained by one or more scoring engines. For example, the matching score of a data record of the results may be obtained by one or more scoring engines. In the case of more than one scoring engine, the matching score may be a combination (e.g., average) of the matching scores obtained by the more than one scoring engine. In one example, out of all the results obtained, one set of results might be processed by one scoring engine and the other set might be processed by some other scoring engines. At least part of the one or more scoring engines that are used to score results of a given search engine may or may not be part of the given search engine.

For example, each search engine of the set of search engines may comprise a scoring engine that is configured to score the results of the respective search engine. In another example, one or more common scoring engines may be used to score the results obtained by the set of search engines. For example, each search engine of the set of search engines may be configured to connect to a scoring engine and to receive scores of the data records from the scoring engine.

The matching scores may be weighted in step 203. The weighting of the matching scores may be performed in accordance with performances of components involved in producing the results. For example, for producing the search results, a search process is performed. The search process may comprise process steps that are performed by system elements such as a search engine in order to obtain search results. The search process may thus have components which are the process steps, system elements and the search results. Each of these components of the search process may have its own performance for performing the respective function. The performance of a component indicates how good the component in performing its function or task. The performance of each component may be quantified by evaluating a respective performance parameter. That performance may affect the search results. In other terms, each component of the search process has a contribution or impact on the quality of the search results obtained. At least part of those contributions may be taken into account by determining and assigning weights for at least part of the components of the search process. The weight assigned to a component may be indicative of (e.g., proportional to) the performance of the component, e.g., if the efficiency of a method step for identifying attributes is 80%, the weight may be 0.8. In one example, a weight may be assigned to each component of the components of the search process. In another example, part of the components of the search process may be selected or identified (e.g. by a user) and those identified components may be associated with respective weights. In one example, the weights may be user defined weights. The weighting step may result in each data record of the search results being associated with weights of components of the search process that resulted in said data record. The matching score of said data record may be weighted by a combination of its associated weights, e.g., the combination may be the multiplication of the weights.

Using the weighted matching scores, the results may be provided in step 205 by removing duplicate data records of the results and keeping the resulting non duplicated data records having a weighted matching score higher than a predefined score threshold. For example, the results may be displayed on a user interface e.g. the user may see a list of rows, each being associated with a data record of the provided results.

The provided results may be operated or used by the user. For example, the user may perform user operations on the provided results. Those user operations may for example be monitored by an activity monitor. For example, after the result list is shown to the user on the user interface, the activity monitor may keep track of the users' clicks on the results shown. A click on a result row may be considered to be the one that the user thinks she/he is looking for.

The user operations may for example optionally be processed and analyzed in step 207. For example, the distribution of count of clicks versus various characteristics of a data record (e.g. which engine it came from, what was the confidence of entity type detection, how complete was the record, how fresh is the record etc.) may be analyzed. This data is captured to find correlations and accordingly weights are calculated based on a lookup table or derived from equation predicted by ML based regression models. Thus, every new click when fed back to this system can change the distribution and hence helps re-assignment of weights. The calculated weights may be used to update in step 209 the weights used to obtain the search results, e.g., the calculated weights may replace the corresponding weights used to obtain the search results. The updated weights may then be used when providing further search results of processing further search requests.

Figure 3:
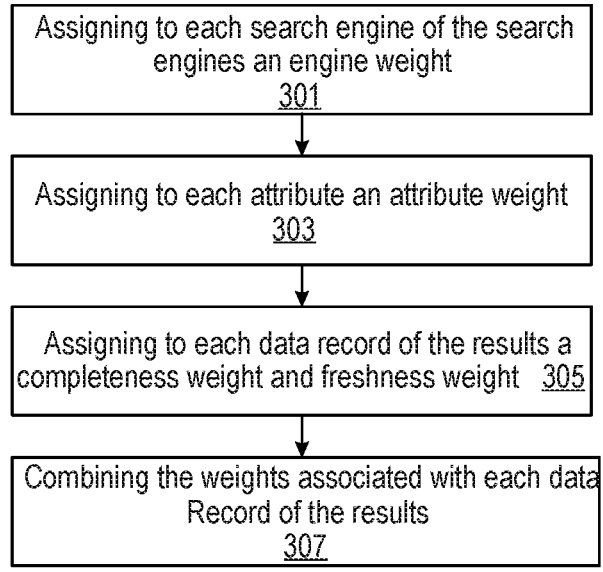
FIG. 3 is a flowchart of a method for providing the search results of multiple search engines.

FIG. 3 is a flowchart of a method for providing the search results of multiple search engines. The method of FIG. 3 may for example be applied to the data management system of FIG. 1 e.g. FIG. 3 may provide details of step 111 of FIG. 1. For clarification purpose, FIG. 3 is described with reference to examples in FIGS. 4A-F, referring to two search engines Engine 1 and Engine 2 and a set of five attributes. One search engine implements a probabilistic search and the other implements a free text search. It is further assumed that the received request or input token is given as Name+DOB and the entity identifier identified a first token as name with 90% confidence and that is sent to search engine 1 and a second token as DOB with 60% confidence and that is sent to search engine 2.

In this example, the components of the search process as executed, for example, by the method of FIG. 1 may comprise the search engines, the identification step 105 and the results. Examples of data records R1 to R6 of the results are provided in tables 401 and 402 of FIG. 4A. The results, R1 to R6, of the two search engines are aggregated and their matching scores are normalized resulting in the matching scores of table 403.

In step 301, each search engine of the search engines may be assigned an engine weight. Examples of the engine weights are shown in FIG. 4B. For example, an initial weight of 0.5 may be assigned to the search engines Engine 1 and Engine 2.

In step 303, each of the set of four attributes: Name, DOB, Address, Identifier and Email, is assigned attribute weights that indicate the confidence level by which said attribute is identified. The attribute weights shown in FIG. 4C may be an initial set of weights that may be updated after execution of a search request. For example, as shown in FIG. 4C, for the attribute Name, and a confidence level between 0% and 10%, the attribute weight is 0.1. In one example, the attribute weight may be obtained using the values of the confidence level e.g. if the confidence level is less than 10%, the attribute weight may be equal to 0.1. However, other weight determining methods may be used.

Figures 4D, 4E, 4F, 5:
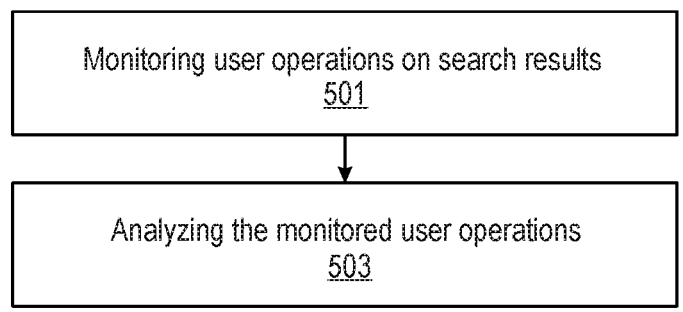
FIG. 4D depicts a table comprising examples of completeness weights.
FIG. 4E depicts a table comprising examples of freshness weights.
FIG. 4F depicts a table comprising result records and associated weights and scores.
FIG. 5 is a flowchart of a method for updating the weights used for weighting the matching scores of data records of the results of processing a search request by multiple search engines.

In step 305, each data record of the results may be assigned a completeness weight indicative of the completeness of the data record and a freshness weight indicative of the freshness of the data record. The table of FIG. 4D shows example values of the completeness weights for a given data record. The completeness weights shown in FIG. 4D may be an initial set of weights that may be updated after execution of a search request. For example, as shown in FIG. 4D, the completeness weights for a given data record may be provided as function of the completeness of the data record. For example, for a completeness between 10% and 20%, the completeness weight is 0.2. In one example, the completeness weight may be obtained using the values of the completeness e.g. if the completeness is less than 10%, the completeness weight may be equal to 0.1. However, other example weighting methods may be used.

The table of FIG. 4E shows example values of the freshness weights for a given data record. The freshness weights shown in FIG. 4E may be an initial set of weights that may be updated after execution of a search request. For example, as shown in FIG. 4E, the freshness weights for a given data record may be provided as function of the freshness of the data record. For example, for a data records having a freshness between 3 and 5 years, the freshness weight is 0.8. However, other example weighting methods may be used.

For each data record of the results the respective engine weight, attribute weight, completeness weight and freshness weight may be combined in step 307 and the score of the data record may be weighted by the combined weight. The combined weight may for example be the multiplication of the four weights. The resulting final scores which are the weighted scores are shown in the table of FIG. 4F. Using the final scores, the results may be filtered and provided to the user. For example, only data records R1, R2 and R6 may be provided to the user as their final scores are higher than the threshold value of 1. The table of FIG. 4F shows the engine weight Wa is 0.5 for records R1, R2 and R3 because they are coming from engine 1 and engine weight Wa of 0.5 for records R4, R5 and R6 because they are coming from engine 2. The attribute weight (associated with name attribute) Wb is 0.9 for R1, R2 and R3 because they are result sets of entity recognizer identifying name attribute with 90% confidence. Attribute weight (associated with DOB attribute) Wb is 0.6 for R4, R5 and R6 because they are a result set of the entity recognizer identifying DOB with 60% confidence. The completeness weight Wc is based on completeness of each record. For example, R1 is 80% complete and hence 0.8 is the completeness weight. The freshness weight Wd is based on freshness of each record. For example, R1 is fresh i.e., last modified date is less than 1 year and hence 1 is the freshness weight. The final score may be obtained as follows: Final score=Initial normalized score*(A*Wa)* (B*Wb)*(C*Wc)*(D*Wd) where A, B, C and D are weights of weights which are assumed to be 1 for the sake of simplicity.

FIG. 5 is a flowchart of a method for updating the weights used for weighting the matching scores of data records of the results of processing a search request by multiple search engines. For simplification purpose, FIG. 5 describes the update of the completeness weights. However, the weight update method may be used for other weights. FIG. 5 may be described with reference to examples of FIG. 4.

Upon providing the results to the user, an activity monitor may monitor in step 501 user operations performed on provided results. For example, the activity monitor may count the number of clicks that have been performed for each data record that is displayed to the user. This may result in the table of FIG. 6A. The table of FIG. 6A shows the number of clicks that have been performed by the user for different completeness of the data records. For example, the user has performed a mouse click one time on a row representing a data record having a completeness of 80%.

Figures 6B, 6C:
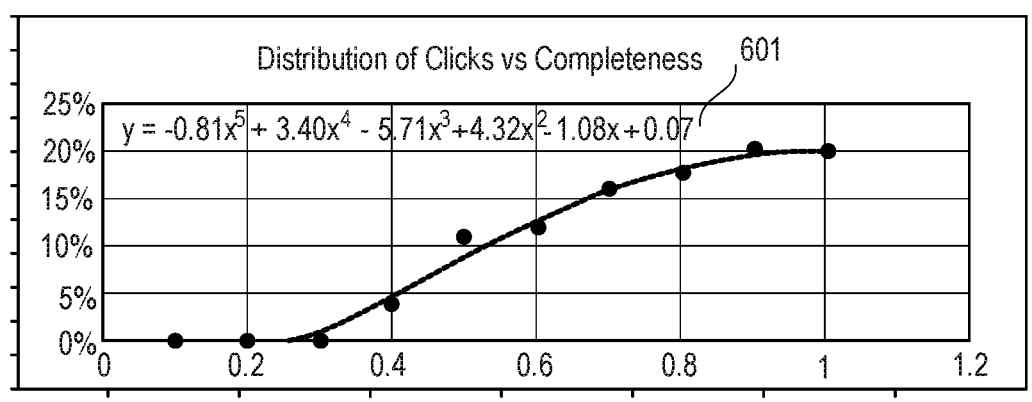
FIG. 6B depicts a table comprising a fractions of user clicks as function of the completeness of data records.
FIG. 6C is a graph of the distribution of the fraction of clicks as function of the completeness of data records.

In step 503, the results of the monitoring operation as shown in FIG. 6A may be processed or analyzed in order to find an updated completeness weight. For that, a look-up table as shown in FIG. 6B may be generated. The look-up table comprises the association between the completeness ranges used for weighting (cf. FIG. 4D) and the percentage of the clicks that have been performed by the user on the data records having the completeness in the listed ranges. In this example, the data shows that the user almost never clicks on records which are less than 30% complete, while ~40% of clicks happened on records which were more than 80% complete. As per the weights in the look-up table, a new record with 60% completeness would be given a weight proportional to 12%. For example, for data records having completeness between 50% and 60%, the fraction of clicks is 12% as obtained from the tables of FIGS. 6A-B. The fraction of clicks may then be used to determine the updated weights. For example, the completeness weight for the completeness range of 50% to 60% would become 0.12 instead of 0.6 of the initial weight (of FIG. 4D).

In another example, the analysis of the user operations may be performed as exemplified in FIG. 6C by modeling the variation of the completeness as function of the fraction of clicks. An example model 601 is shown in FIG. 6C. This model 601 may be used to determine the updated weight for a given value of the completeness. The model 601 is described by an equation that may be predicted by ML based regression models.

The results of the present method may be updated weights that can be used to replace the initial weights as provided for example in FIG. 4. The updated weights may be used for weighting matching scores of data records that results from performing a new search request.

Figure 7:
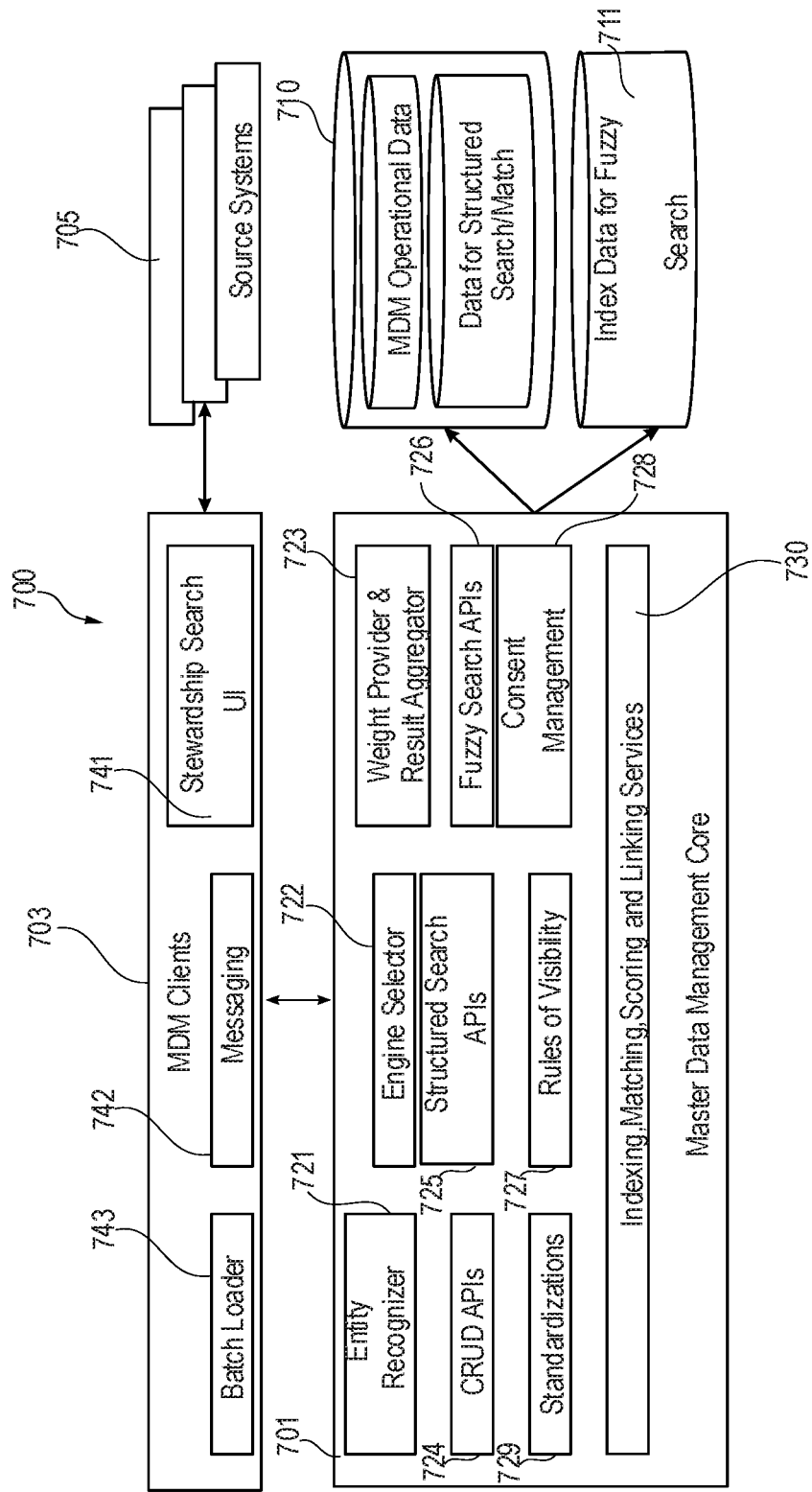
FIG. 7 depicts a block diagram representation of a computer system 700 in accordance with an example of the present disclosure.

FIG. 7 depicts a block diagram representation of a computer system 700 in accordance with an example of the present disclosure. The computer system 700 may, for example, be configured to perform master data management. The computer system 700 comprises a master data management system 701 and one or more client systems 703. The client systems 703 may have access to data sources 705. The master data management system 701 may control access (read and write accesses etc.) to a central repository 710. The master data management system 701 may make use of index data 711 for processing fuzzy searches.

The master data management system 701 may process data records received from client systems 703 and store the data records into central repository 710. The client system 703 may for example obtain data records from the different data sources 705. The client systems 703 may communicate with the master data management system 701 via a network connection which comprises, for example, a wireless local area network (WLAN) connection, WAN (Wide Area Network) connection LAN (Local Area Network) connection or a combination thereof.

The master data management system 701 may further be configured to process data requests or queries for accessing data stored in the central repository 710. The queries may for example be received from the client systems 703. The master data management system 701 comprises an entity recognizer 721 for identifying attributes or entities in received data requests. The entity recognizer 721 may for example identify names and types of entities, numerical and temporal expressions in user inputs coming in as unstructured text and maps them to the attributes of data records stored in the central repository 710 with certain probabilities or confidence, which allows them to be used for performing a structured search attributes. For example, the entity recognizer 721 may be a token recognizer that identifies a string/numeric value or a patterns name, location, like email should be following abc@uvw.xyz or phone numbers following ten digit number or SSN following AAA-BB-CCCC structure. The entity recognizer 721 may be configured to use a machine leaning model to classify or identify input data attributes of the data records stored in the central repository 710. The master data management system 701 further comprises an engine selector 722 for selecting one or more engines that are suitable for performing a received search request. The engine selector 722 may decide to use one or more engines for processing the data either in parallel or sequentially, based on pre-built heuristics. For example, initially rules used for selecting the engines are based mainly on the capability/applicability of the engines corresponding to a given set of attributes and the entity types. After the initial processing of a first request, the engine selector keeps improving its rules based on users' clicks, feedback and the outcome (quality and performance) of the searches done so far. The engine selector 722 may also dynamically choose an alternate engine, if a previous choice of a search engine delivers no results. Multiple search engines may be selected and used to get a good list of candidates, based on rules of the engine selector 722. Search results from all the engines are aggregated and duplicates are removed. Resulting candidate list is then scored. Multiple scoring engines are used. Depending on the attributes, scoring functions may or may not be available. In addition to a PME based scorer other scoring engines are used to score the results of the search. For example, out of all the results obtained, one set of results might go to one scorer and the other set might go to some other scoring engine. The invocation of these engines may be done in parallel to improve efficiency.

The master data management system 701 further comprises a weight provider and result aggregator 723 for weighting and aggregating the results obtained by the search engines. Once the scoring is done by all the scorers, the aggregation of result may be based on a weighted mean of the scores.

The weights are derived and refined over a period of time by finding patterns and the correlations between characteristics of result sets and the match quality. An analyzer may use machine learning to recognize these correlations. The characteristics of the result sets under analysis may include (but are not limited to) at least one of the following: the match engine used to get the score e.g. a particular scoring engine may have a wider score range or less reliable than others; the certainty with which an input data type was detected by the entity recognizer; the completeness of a record, e.g., indicating how many fields are populated and freshness of data (last update date). Weights are a set of numbers that are used to modify the score of the result set. The match quality is indicated by an analysis of the user clicks. The clicks on the shown results are indicative of users understanding of a better match. The match quality may also be based on explicit feedbacks about a match quality that can be sought on the UI. The analysis of the correlation is fed back to improve the weight provider 723. The results obtained by the search engines are aggregated using the weights and then based on the comparison with the threshold records are carried over to the next stage.

The master data management system 701 further comprises different APIs for enabling the storage as well as the access to data in the central repository 710. For example, the master data management system 701 comprises Create, Read, Update, and Delete (CRUD) APIs 724 for enabling access to data such as the storage of new data records in the central repository 710. The master data management system 701 further comprises APIs associated with the search engines that it comprises. FIG. 7 shows for exemplification purpose two types of APIs, namely structured search APIs 725 and fuzzy search APIs 726.

The master data management system 701 further comprises components enabling to filter the results to be provided to the user. For example, the master data management system 701 comprises a component 727 for applying rules of visibility and another component 728 for applying the consent management. The master data management system 701 comprises a component 729 for applying standardization rules on data to be stored in the central repository 710. The filtering may be advantageous as in master data management solutions, data security and privacy are of utmost importance. While a full-text search would try to cast a wide net to find a match, it may be ensured that such an over-reach remains internal to the system and the information is not inadvertently disclosed to an unsolicited user. For that, multiple filters will check if the user querying has access to returned fields and if the resulting records have necessary associated consent from the data owner to be used for the processing purposes supplied by the user. The filtering is done at a later stage of the search process to allow proper matching with all possible attributes. The outcome of the filtering may be a list of records in decreasing order of the match score, containing those records that have provided the needed consents with only those columns which are allowed or viewable for the user initiating the search.

The master data management system 701 further comprises indexing, matching, scoring and linking services 730. Each of the client systems 703 may comprise a stewardship search user interface (UI) 741 for submitting search queries for querying data in the central repository 710. Each of the client systems may further comprise services such as messaging services 742 and batch loading services 743.

The operation of the computer system 700 will be described in detail with reference to FIG. 8.

Figure 8:
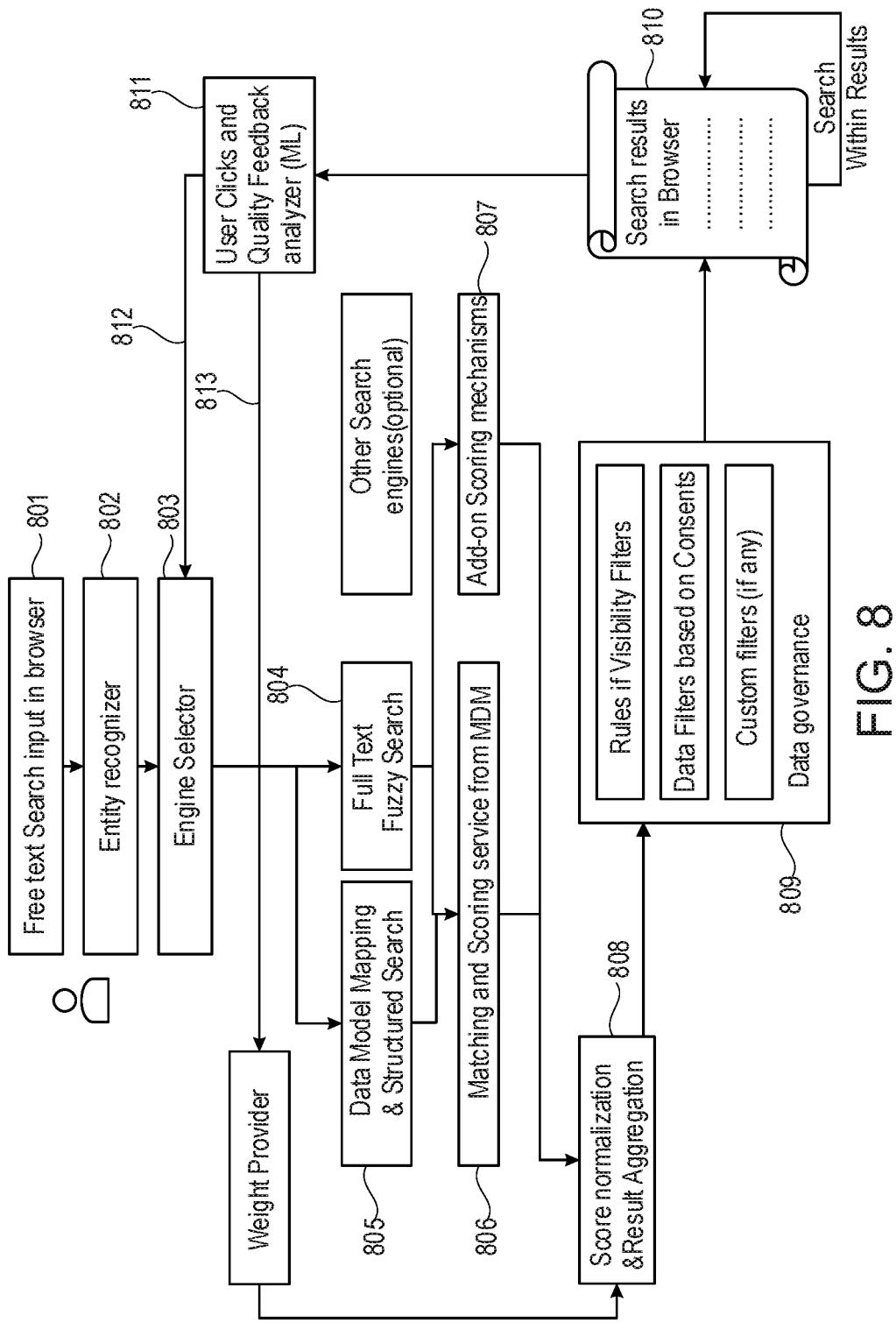
FIG. 8 depicts a flowchart for method describing an example operation of the master data management system.

FIG. 8 depicts a flowchart for a method describing an example operation of the master data management system 701. In block 801, a free text search may be input in a browser e.g. which may be an example of stewardship search UI 741. The entity recognizer 721 may receive (block 802) the free text search request and may process the received request as described herein, e.g., in FIG. 1, to identify attributes or entities. The engine selector 722 may then be used (block 803) to select the search engines that are suitable for the identified attributes. As exemplified in FIG. 8, two search engines are selected and are used (blocks 804 and 805) to execute the received search request. The results of the execution of the search request, may be scored using a matching and scoring service of the master data management system 701 (block 806). The scoring may further use an add-on scoring mechanisms (block 807). The results are then aggregated, and the scores are normalized (block 808). Before providing the results to the user, some filters may be applied (block 809). Those filters may for example include at least one of rules of visibility filters and data filters based on consent and custom filters. The filtered results are then displayed (block 810) in the browser (e.g. the browser that received the free text search). The displayed results may be monitored (block 811) and analyzed by a user clicks and quality feedback analyzer. For example, the analyzer may use a machine learning model for determining weights based on user actions on the results. The weights can be used to update the engine selector 722 and a weight provider 723 as indicated by arrows 812 and 813. Weights provided by the weight provider 723 may then be used for the scoring block 808 in a next iteration of the method.

Figure 9:
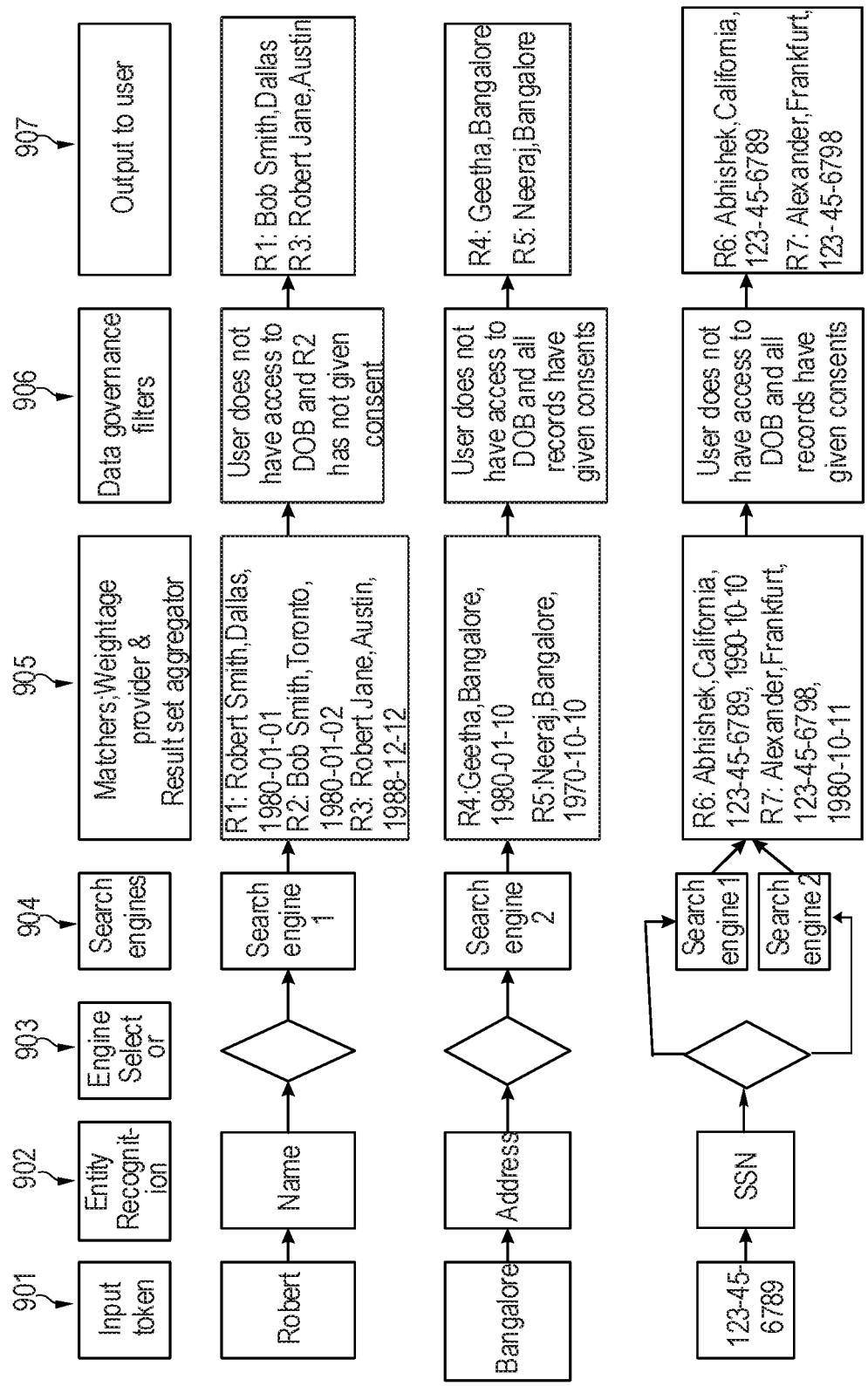
FIG. 9 depicts a diagram illustrating an example of processing requests in accordance with the present subject matter.

FIG. 9 depicts a diagram illustrating an example of processing requests in accordance with the present subject matter. The first column 901 of FIG. 9 shows an example content of a received request or input token. For example, the received requests may comprise "Robert", "Bangalore", and a number "123-45-6789". The second column 902 shows the results of the entity recognition when processing the received requests. For example, "Robert" is identified as being a name attribute, "Bangalore" is identified as being an address attribute and the number "123-45-6789" is identified as being an SSN attribute. Columns 903 and 904 indicate that the engine selector has selected search engine "Search engine1" for processing the request of "Robert". Columns 903 and 904 further indicate that the engine selector has selected search engine "Search engine2" for processing the request of "Bangalore". Columns 903 and 904 further indicate that the engine selector has selected both search engines "Search engine1" and "Search engine2" for processing the request of "123-45-6789". The results of processing the requests are processed e.g. aggregated, before being provided as indicated in column 905. For example, column 905 shows that the search engine "Search engine1" has found records R1, R2 and R3 when searching for "Robert". Column 905 further shows that the search engine "Search engine2" has found records R4 and R5 when searching for "Bangalore". Column 905 further shows that the search engine "Search engine1" has found record R6 when searching for "123-45-6789" and that the search engine "Search engine2" has found record R7 when searching for "123-45-6789". Before being provided to the user, the results R1 to R7 may need to be filtered using data governance filters as indicated in column 906. After being filtered, the results may then be output to the user as indicated in column 907. As shown in column 907 the date of birth values was filtered out of the records R1 to R7 as the user who submitted the results is not allowed to access them.

It is understood that one or more of the aforementioned embodiments of the invention may be combined as long as the combined embodiments are not mutually exclusive.

Various embodiments are specified in the following embodiments:

1. A method for accessing data records of a master data management system, the data records comprising multiple attributes, the method comprising:
   enhancing the master data management system with one or more search engines for enabling access to the data records;
   receiving at the master data management system a request of data;
   identifying a set of one or more attributes, of the multiple attributes, which are referenced in the received request;
   selecting a combination of one or more search engines, of the search engines of the master data management system, whose performances for searching values of at least part of the set of attributes fulfill a current selection rule;
   processing the request using the combination of search engines; and providing at least part of the results of the processing.

2. The method of clause 1, further comprising updating the selection rule based on user operations on the provided results, the updated selection rule becoming the current selection rule and upon receiving another request of data, repeating the identifying, selecting, processing and providing steps using the current selection rule.

3. The method of clause 1, wherein the results comprise data records of the master data management system in association with respective matching scores as obtained by scoring engines of the search engines, the method further comprising weighting the matching scores in accordance with performances of components involved in providing the results, the components comprising at least part of method steps, elements used for providing the results and the results, wherein the provided results comprise non duplicated data records having a weighted matching score higher than a predefined score threshold.

4. The method of clause 3, the components comprising the search engines, the identification step and the results, the method further comprising:
   assigning to each search engine of the search engines an engine weight;
   assigning attribute weights to the set of attributes, wherein the attribute weight of an attribute is indicative of the confidence level by which said attribute is identified;
   assigning to each data record of the results a completeness weight indicative of the completeness of the data record and a freshness weight indicative of the freshness of the data record; and
   for each data record of the results combining the respective engine weight, attribute weight, completeness weight and freshness weight, and weighting the score of the data record by the combined weight.

5. The method of clause 4, further comprising:
   providing a user parameter quantifying the user operations;

for each component of at least part of the components, determining the values of the user parameter and associated values of a component parameter descriptive of the component;

and using the determined association for updating the weight assigned to the component.

6. The method of clause 5, further comprising providing a look-table associating the user parameter's values with the values of the component parameters, and using the look-table for updating the weight assigned to the component.

7. The method of clause 5, further comprising modeling the variation of the user parameter's values with the values of the component parameter using a predefined model, and using the model for determining an updated weight of the component and using the updated weight for updating the weight assigned to the component.

8. The method of clause 5, wherein a user operation of the user operations comprises an indication of a selection of a result, the indication comprising a mouse click on a displayed result of the provided results, wherein the user parameter comprises at least one of the number of clicks, the frequency of clicks and the duration of accessing a given result of the results.

9. The method of clause 1, wherein the results comprise data records of the master data management system in association with respective matching scores as obtained by scoring engines of the search engines, wherein the provided results comprise non duplicated data records having a matching score higher than a predefined score threshold.

10. The method of clause 1, wherein for each attribute of the set of attributes, the selection rule comprises:

for each search engine of the search engines, determining a value of a performance parameter indicative of the performances of the search engine for searching values of the attribute;

selecting the search engines whose performance parameter values are higher than a predefined performance threshold value.

11. The method of clause 10, the performance parameter comprises at least one of: the number of results and the level of matching of the results to the expectations.

12. The method of clause 10, the selection rule using a table associating attributes to corresponding search engines, the updating of the selection rule comprising:

determining the values of a user parameter quantifying the user operations on provided results of each search engine of the combination of the search engines; and using the determined values associated with each search engine of the combination of the search engines for identifying the values of the user parameter that are smaller than a predefined threshold and for each identified value of the user parameter determining the attribute of the set of attributes and the search engine that is associated with the identified value and updating the table using the determined attribute and search engine.

13. The method of clause 1, wherein the processing of the request is performed in parallel by the combination of the search engines.

14. The method of clause 1, wherein the combination of search engines is a ranked list of search engines, wherein the processing of the request is consecutively performed following the ranked list until a minimum number of results is exceeded.

15. The method of clause 1, wherein identifying the set of attributes comprises inputting the received request to a predefined machine learning model; receiving from the machine learning model a classification of the request, the classification indicating the set of attributes.

16. The method of clause 1, inputting the set of attributes to a predefined machine learning model and receiving from the machine learning model one or more search engines that may be used for searching the set of attributes.

17. The method of clause 16, further comprising: receiving a training set indicative of different sets of one or more training attributes, wherein each set of training attributes is labeled to indicate search engines that are suitable to perform the search of the set of training attributes; training a predefined machine learning algorithm using the training set, thereby generating the machine learning model.

18. The method of clause 1, wherein the provided results comprises data records that are filtered depending on the sender of the request.

19. A method for providing search results of a search engine in accordance with a predefined search process, the method comprising:

receiving results of a search request as obtained by the search engine, each result of the results being associated with a matching score;

for each result of the results, determining a set of one or more components of the search process that are involved in providing the result and assigning a predefined weight to each component of the set of components;

weighting the matching scores using the weights; and providing the results having a weighted matching score higher than a predefined score threshold.

20. The method of clause 19, further comprising:

analyzing user operations on the provided results by evaluating a user parameter quantifying the user operations;

for each component of at least part of the set of components, determining one or more values of a component parameter descriptive of the component and associated values of the user parameter;

determining updated weights using the determined association;

replacing the weights assigned to the at least part of components by the determined weights; and using the updated weights for repeating the method on further received search results.

21. The method of clause 20, further comprising providing a table associating the user parameter's values with the values of the component parameters, and using the table for updating the weight assigned to the component.

22. The method of clause 20, further comprising modeling the association between the values using a predefined model, and using the model for determining an updated weight of the component and using the updated weight for updating the weight assigned to the component.

23. The method of clause 20, wherein a user operation of the user operations comprises a mouse click on a displayed result of the provided results, wherein the user parameter comprises at least one of the number of clicks, the frequency of clicks and the duration of accessing a given result of the results.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for accessing data records of a master data management system, the data records comprising multiple attributes, the method comprising:
    enhancing the master data management system with one or more search engines for enabling access to the data records;
    receiving at the master data management system a request of data;
    identifying, by an entity identifier, a set of one or more attributes and one or more entity types associated with the one or more attributes, of the multiple attributes, which are referenced in the received request, wherein the entity identifier relies on machine learning (ML) model;
selecting a combination of one or more search engines, of the search engines of the master data management system, whose performances for searching values of at least part of the set of attributes and the one or more entity types fulfill a current selection rule;
editing a configuration of the master data management system to search with the combination of one or more search engines;
processing the request using the combination of search engines, wherein the master data management system accesses the search engines with interfaces comprising a structured search application programming interface (API) and a fuzzy search API;
providing, at least in part, results of the processing based on displaying the results of the processing in a browser;
inputting the set of attributes to a predefined machine learning model and receiving from the machine learning model one or more search engines that may be used for searching the set of attributes;
receiving a training set indicative of different sets of one or more training attributes, wherein each set of training attributes is labeled to indicate search engines that are suitable to perform the search of the set of training attributes; and
training a predefined machine learning algorithm using the training set, thereby generating the machine learning model.

2. The method of claim 1, further comprising:
updating the selection rule based on user operations on the results, the updated selection rule becoming the current selection rule and upon receiving another request of data, repeating the identifying, selecting, processing and providing steps using the current selection rule.

3. The method of claim 2, wherein a user operation of the user operations comprises an indication of a selection of a result, the indication comprising a mouse click on a displayed result of the provided results, wherein the user parameter comprises at least one of the number of clicks, the frequency of clicks and the duration of accessing a given result of the results.

4. The method of claim 1, wherein the results comprise data records of the master data management system in association with respective matching scores obtained by scoring engines of the search engines, further comprising:
weighting the matching scores in accordance with performance of components involved in providing the results, the components comprising at least part of method steps, elements used for providing the results in combination with the results, wherein the results comprise non-duplicated data records having a weighted matching score higher than a predefined score threshold.

5. The method of claim 4, further comprising:
providing a user parameter quantifying user operations;
determining values of user parameters and associated values of component parameters descriptive of the components; and
using the values and the association values for updating the weights assigned to the components.

6. The method of claim 4, further comprising:
providing a look-table associating the user parameters values with the values of the component parameters and using the look-table for updating the weight assigned to the components.

7. The method of claim 4, further comprising:
modeling the variation of the user parameter's values with the values of the component parameters using a predefined model, and using the model for determining updated weights of the components and using the updated weights for updating the weights assigned to the components.

8. The method of claim 1, wherein components providing the results comprising the search engines, the identifying step and the results, further comprising:
assigning attribute weights to the set of attributes, wherein the attribute weight of an attribute is indicative of a confidence level by which said attribute is identified;
assigning completeness weights and freshness weights to the data records of the results, wherein the completeness weights are indicative of the completeness of the data records and the freshness weights are indicative of the freshness of the data records; and
creating a combined weight based on at least a respective engine weight, an attribute weight, a completeness weight and a freshness weight, and weighting a score of the data record by the combined weight.

9. The method of claim 1, wherein the results comprise data records of the master data management system in association with respective matching scores as obtained by scoring engines of the search engines, wherein the provided results comprise non-duplicated data records having a matching score higher than a predefined score threshold.

10. The method of claim 1, wherein for each attribute of the set of attributes, the selection rule comprises:
determining values of performance parameters indicative of the performances of the search engines for searching values of the attribute; and
selecting the search engines whose performance parameter values are higher than a predefined performance threshold value.

11. The method of claim 10, wherein the performance parameters comprises at least one of the number of results or the level of matching of the results to the expectations.

12. The method of claim 10, the selection rule using a table associating attributes to corresponding search engines, the updating of the selection rule comprising:
determining the values of a user parameter quantifying the user operations on provided results of the combination of the search engines; and
using the determined values associated with the combination of the search engines for identifying the values of the user parameters that are smaller than a predefined threshold and for the identified values of the user parameters, determining the attributes of the set of attributes and the search engines that are associated with the identified values and updating the table using the determined attributes and search engines.

13. The method of claim 1, wherein the combination of search engines is a ranked list of search engines, wherein the processing of the request is consecutively performed following the ranked list until a minimum number of results is exceeded.

14. The method of claim 1, wherein identifying the set of attributes comprises:
inputting the received request to a predefined machine learning model; and
receiving from the machine learning model a classification of the request, the classification indicating the set of attributes.

15. The method of claim 1, wherein the provided results comprise data records that are filtered depending on the sender of the request.

16. A computer program product comprising:
a computer-readable storage medium having computer-readable program code embodied therewith, the computer-readable program code configured to for accessing data records of a master data management system, the data management system comprising search engines for enabling access to the data records, the data records comprising multiple attributes, the computer-readable program code further configured to:
receive at the master data management system a request of data;
identify, by an entity identifier, a set of one or more attributes and one or more entity types associated with the one or more attributes, of the multiple attributes, which are referenced in the received request, wherein the entity identifier relies on machine learning (ML) model;
select a combination of one or more search engines, of the search engines of the master data management system, whose performances for searching values of at least part of the set of attributes and the one or more entity types fulfill a current selection rule;
edit a configuration of the master data management system to search with the combination of one or more search engines;
process the request using the combination of search engines, wherein the master data management system accesses the search engines with interfaces comprising a structured search application programming interface (API) and a fuzzy search API;
provide at least part of the results of the processing based on displaying the results of the processing in a browser;
inputting the set of attributes to a predefined machine learning model and receiving from the machine learning model one or more search engines that may be used for searching the set of attributes;
receiving a training set indicative of different sets of one or more training attributes, wherein each set of training attributes is labeled to indicate search engines that are suitable to perform the search of the set of training attributes; and
training a predefined machine learning algorithm using the training set, thereby generating the machine learning model.

17. A computer system for enabling access to data records of a master data management system, the data records comprising multiple attributes, the computer system comprising:
a user interface configured for receiving a request of data;
a plurality of search engines for enabling access to the data records, wherein the search engines are configured for processing the request;
an entity identifier configured for identifying, a set of one or more attributes and one or more entity types associated with the one or more attributes, of the multiple attributes, which are referenced in the received request, wherein the entity identifier relies on machine learning (ML) model;
an engine selector configured for selecting a combination of one or more search engines, of the search engines, whose performances for searching values of at least part of the set of attributes and the one or more entity types fulfil a current selection rule, wherein the search engines are accessed with interfaces comprising a structured search application programming interface (API) and a fuzzy search API;
an editor for editing a configuration of the master data management system to search with the combination of one or more search engines;
a result provider configured for providing at least part of the results of the processing based displaying the results of the processing in a browser;
inputting the set of attributes to a predefined machine learning model and receiving from the machine learning model one or more search engines that may be used for searching the set of attributes;
receiving a training set indicative of different sets of one or more training attributes, wherein each set of training attributes is labeled to indicate search engines that are suitable to perform the search of the set of training attributes; and
training a predefined machine learning algorithm using the training set, thereby generating the machine learning model.

18. The computer system of claim 17, wherein the results comprise data records of the computer system in association with respective matching scores as obtained by scoring engines of the search engines, the computer system further comprising:
a weight provider configured for weighting the matching scores in accordance with performances of components involved in providing the results, the components comprising at least part of method steps and elements used for providing the results and the results, wherein the provided results comprise non duplicated data records having a weighted matching score higher than a predefined score threshold.

* * * * *